(12) United States Patent
Asano

(10) Patent No.: US 7,308,885 B2
(45) Date of Patent: Dec. 18, 2007

(54) ENGINE CONTROL SYSTEM WITH FUEL INJECTION TIMING CONTROL METHOD

(75) Inventor: Seiji Asano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/477,770

(22) Filed: Jun. 30, 2006

(65) Prior Publication Data
US 2007/0000475 A1    Jan. 4, 2007

(30) Foreign Application Priority Data
Jul. 1, 2005   (JP) ............................. 2005-194126

(51) Int. Cl.
*F02D 41/34* (2006.01)

(52) U.S. Cl. ............ 123/305; 123/406.25; 123/406.47; 701/105

(58) Field of Classification Search ........... 123/406.25, 123/406.47, 305; 701/105
See application file for complete search history.

(56) References Cited

U.S. PATENT DOCUMENTS

| | | | |
|---|---|---|---|
| 4,479,186 A * | 10/1984 | Takao et al. ................. | 701/105 |
| 4,551,803 A * | 11/1985 | Hosaka et al. ............... | 701/105 |
| 6,058,348 A * | 5/2000 | Ohyama et al. ............. | 701/103 |
| 2003/0139872 A1 * | 7/2003 | Miki ....................... | 123/406.47 |
| 2004/0094119 A1 | 5/2004 | Dietl et al. | |

FOREIGN PATENT DOCUMENTS

| | | |
|---|---|---|
| DE | 100 19 466 A1 | 11/2000 |
| DE | 100 46 597 A1 | 3/2001 |
| EP | 1 406 003 A1 | 4/2004 |
| EP | 1 647 690 A1 | 4/2006 |
| EP | 1 650 429 A2 | 4/2006 |
| JP | 2005-2896 A | 1/2005 |

OTHER PUBLICATIONS

European Search Report dated Oct. 30, 2006 (five (5) pages).

* cited by examiner

*Primary Examiner*—Erick R. Solis
(74) *Attorney, Agent, or Firm*—Crowell & Moring LLP

(57) ABSTRACT

A fuel control system for a cylinder direct injection internal combustion engine. A predetermined portion of the fuel spray is appropriately ignited regardless of the correction of the ignition timing, thereby always securing stable, satisfactory combustion. In the case where the ignition timing is corrected, the fuel injection timing is corrected in accordance with the ignition timing correction amount. The fuel injection timing is corrected also with the change in the internal cylinder pressure and the fuel injection velocity taking the intake pipe pressure and the fuel pressure into account, thereby maintaining the required ignition point of the fuel spray.

7 Claims, 18 Drawing Sheets

ENGINE CONTROL SYSTEM WITH FUEL INJECTION TIMING CONTROL METHOD

BACKGROUND OF THE INVENTION

This invention relates to a fuel control system and a fuel injection timing control method for an internal combustion engine used with a vehicle such as an automobile, or in particular to a fuel control system and a fuel injection timing control method for a cylinder direct injection internal combustion engine for injecting the fuel directly into each combustion chamber.

A conventional fuel injection control system for the cylinder direct injection internal combustion engine with the fuel injected directly into the combustion chamber from a fuel injection valve (injector) has been proposed, wherein the fuel injection start timing is changed in accordance with the fuel pressure based on a map of fuel pressure versus fuel injection start timing preset in order to maintain the position unchanged at which the fuel spray injected from the injector collides with a cavity (piston depression) formed at the piston top in the combustion chamber, i.e. in order to maintain the same colliding position at a reference fuel pressure irrespective of the fuel pressure change, and wherein the injection end timing is calculated from the fuel injection start timing corrected based on the map and the fuel is injected based on these information (JP-A-2005-2896).

This fuel control system is for the cylinder direct injection internal combustion engine for combusting the compressed natural gas and can establish the stratified combustion low in robustness.

In the conventional fuel control system described above, the ignition timing remains at the basic ignition timing as long as the internal combustion engine is in steady operation, and therefore it is possible to maintain the optimum position at which the fuel spray collides with the cavity thereby to ignite the fuel spray at a predetermined position (predetermined portion).

During the idle operation or the acceleration/deceleration, however, the ignition timing is corrected with respect to the basic ignition timing and therefore an unpredicted portion of the fuel spray may be ignited for deterioration of fuel combustion.

SUMMARY OF THE INVENTION

This invention has been achieved in view of the problem described above, and the object thereof is to provide a fuel control system and a fuel injection timing control method for the internal combustion engine used for a vehicle such as an automobile, in which a stable combustion in each cylinder can be secured even in the case where the ignition timing changes from the basic ignition timing due to the correction, etc. and in which a stable, satisfactory combustion is secured even in the case where the fuel spray conditions (procession straightness, velocity of injection fuel, etc.) change due to the change in fuel pressure or intake pipe pressure.

According to one aspect of the invention, there is provided a fuel control system for a cylinder direct injection internal combustion engine, in which the fuel is injected directly into each combustion chamber through a fuel injection valve (injector), and which includes a fuel injection timing correction means for correcting the timing of fuel injection by the fuel injection valve in accordance with the corrected ignition timing.

According to another aspect of the invention, there is provided a fuel control system for the cylinder direct injection internal combustion engine, in which the fuel is injected toward a cavity formed at the top of each piston in the combustion chamber by the fuel injection valve, and which includes a fuel injection timing correction means for correcting the timing of fuel injection by the fuel injection valve in accordance with the corrected ignition timing and a fuel injection timing limiting means for limiting the correction amount of the fuel injection timing in accordance with the state of the internal combustion engine in such a manner that the fuel spray reaches the cavity.

In the fuel control system for the internal combustion engine according to the invention, the fuel injection timing limiting means preferably sets the upper and lower limits of the fuel injection timing in accordance with the engine speed and the fuel pressure as a state of the internal combustion engine and accordingly limits the correction amount of the fuel injection timing.

In the fuel control system for the internal combustion engine according to the invention, the fuel injection timing correction means preferably corrects the injection timing by advance in the case where the ignition timing is corrected by advance and corrects the injection timing by retardation in the case where the ignition timing is corrected by retardation.

The fuel control system for the internal combustion engine according to the invention is preferably used with an internal combustion engine, in which the ignition timing is corrected at the time of at least one of the modes including the idling operation and the acceleration/deceleration.

In the fuel control system for the internal combustion engine according to the invention, the fuel injection timing correction means preferably corrects the fuel injection timing taking the parameters involving the fuel injection velocity into consideration. The parameters involving the fuel injection velocity include at least one of the fuel pressure and the intake pipe pressure.

According to still another aspect of the invention, there is provided a fuel injection timing control method for the cylinder direct injection internal combustion engine, in which the fuel is injected directly into the combustion chamber by a fuel injection valve and in which the timing of fuel injection by the fuel injection valve is corrected in accordance with the corrected ignition timing.

According to this invention, the timing of fuel injection by the fuel injection valve is corrected in accordance with the corrected ignition timing. Even in the case where the ignition timing is changed from the basic ignition timing by the ignition timing correction, therefore, the fuel spray can be ignited at a predetermined position preset during the steady state of the internal combustion engine, thereby making possible stable combustion in each cylinder.

Other objects, features and advantages of the invention will become apparent from the following description of the embodiments of the invention taken in conjunction with the accompanying drawings.

DESCRIPTION OF THE EMBODIMENTS

The fuel control system for an internal combustion engine according to embodiments of the invention is described in detail below with reference to the drawings.

Figure 1:
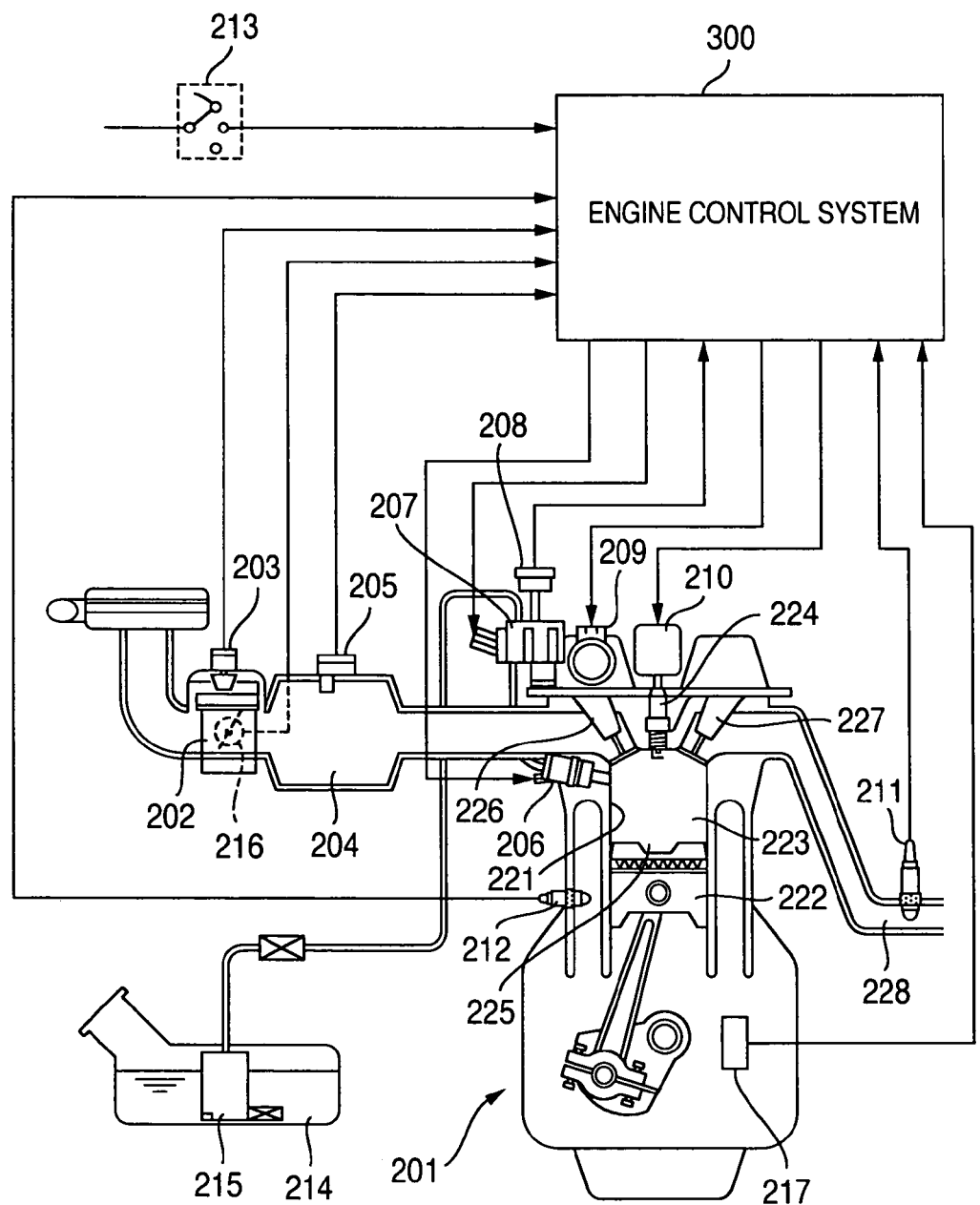
FIG. 1 is a diagram showing a general configuration of an internal combustion engine using a fuel control system according to an embodiment of the invention.

FIG. 1 is a diagram showing a general configuration of an internal combustion engine according to an embodiment of the invention.

In FIG. 1, the internal combustion engine (hereinafter referred to simply as the engine) 201 a cylinder direct injection multi-cylinder engine such as a four-cylinder engine having four cylinder bores 221. The four cylinder bores 221 each have a piston 222, and each cylinder bore 221 makes up a combustion chamber 223.

A concave cavity (depression) 225 is formed on the top surface of the piston 222. The cavity 225 is formed to an optimum shape to provide with a vertical swirl to the fuel spray injected from a fuel injection valve 206 in stratified combustion described later.

Only one cylinder (combustion chamber 223) is shown in FIG. 1.

The engine 201 includes a throttle valve 202 for measuring the amount of intake air and an idle speed control valve (ISC valve) 203.

The idle speed control valve 203 controls the area of a flow path bypassing the throttle valve 202 and connected to the intake pipe 204 thereby to control the rotational speed of the engine 201 in idle operation.

The intake pipe 204 has mounted thereon an intake pipe pressure sensor 205 for detecting the internal pressure of the intake pipe 204. Also, the throttle valve has mounted thereon a throttle opening degree sensor 216 for detecting the opening degree of the throttle valve 202.

The engine 201 has a fuel injection valve 206 for each cylinder thereof. The fuel injection valve 206 injects fuel directly toward the cavity 225 in the combustion chamber 223.

In the fuel supply system for the fuel injection valve 206, the fuel (a liquid fuel such as gasoline) is pumped up from a fuel tank 214 by a low-pressure fuel pump 215 (primary pressure application), and the fuel under primary pressure is subjected to a secondary pressure application (fuel pressure adjustment) by a high-pressure fuel pump 207. The high-pressure fuel subjected to the secondary pressure application is supplied to the fuel injection valve 206.

The pressure (fuel pressure) of the high-pressure fuel supplied to the fuel injection valve 206 is detected by fuel pressure sensor 208.

The engine 201 includes a spark plug 224 for igniting the mixture gas of fuel and air supplied into each combustion chamber 223, and an ignition module 210 for supplying the ignition energy to the spark plug 224 based on the ignition signal output from the engine control system 300.

Also, the engine 201 includes a camshaft sensor 209 for detecting the can angle of the intake valve 226, a crank angle sensor 217 for detecting the crank angle of the engine 201 and a water temperature sensor 212 for detecting the cooling water temperature of the engine 201. The camshaft sensor 209 may alternatively detect the cam angle of an exhaust valve 227.

An oxygen concentration sensor 211 for detecting the concentration of oxygen in the exhaust gas is mounted on the exhaust pipe 228 of the engine 201. According to this embodiment, the oxygen concentration sensor 211 outputs a signal proportional to the air-fuel ratio determined from the exhaust gas. As an alternative, the oxygen concentration sensor 211 may output two kinds of signals on rich and lean sides of the stoichiometric air-fuel ratio based on the exhaust gas.

The idle speed of the engine 201 is controlled by the idle speed control valve 203. In the case where the throttle valve 202 is controlled by an electric motor or the like, however, the idle speed control valve 203 is eliminated. Although the fuel is controlled by detecting the intake pipe pressure in this embodiment, the fuel can alternatively be controlled by detecting the intake air amount of the engine.

Figure 2:
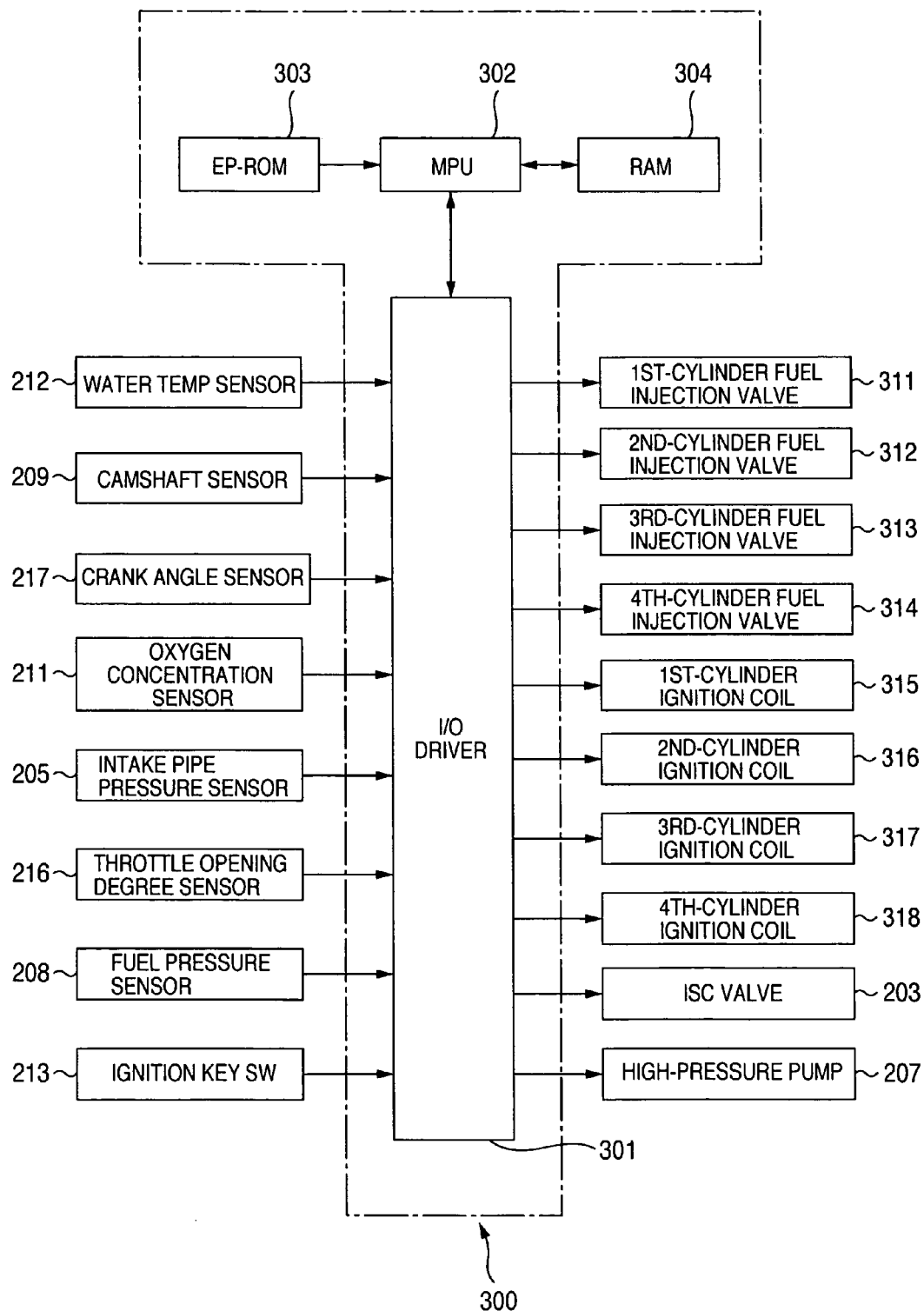
FIG. 2 is a block diagram showing a control system of an automotive internal combustion engine using a fuel control system according to this invention.

The engine control system 300 is of microcomputer type, and as shown in FIG. 2, includes an I/O driver (LSI) 301 for converting the electrical signal of each sensor mounted in the engine 201 into a control signals for digital operation and also converting the control signals for digital operation into actual drive signals for actuators, an arithmetic unit (MPU) 302 for determining the state of the engine 301 based on the signal for digital operation from the I/O driver 301, calculating the fuel amount and the ignition timing required of the engine 201 based on a predetermined procedure and sending the calculated value to the I/O driver 301, a nonvolatile memory 303 for storing the control procedure and the control constants of the arithmetic unit 302, and a volatile memory 304 for storing the calculation results of the arithmetic unit 302.

The volatile memory 304 may be connected with a backup power supply intended to hold the memory contents even in the case where power fails to be supplied to the engine control system 300 with the ignition key switch 213 off.

The engine control system 300 according to this embodiment is supplied with signals from the water temperature sensor 212, the camshaft sensor 209, the crank angle sensor 217, the oxygen concentration sensor 211, the intake pipe pressure sensor 205, throttle opening degree sensor 216, the fuel pressure sensor 208 and the ignition key switch 213, and outputs a fuel injection signal to the first- to fourth-cylinder fuel injection valves 311 to 314, an ignition command signal to the first- to fourth-cylinder ignition coils 315 to 318, an opening degree command signal to the ISC valve 203 and a fuel pressure control command signal to the high-pressure fuel pump 207.

The first- to fourth-cylinder fuel injection valves 311 to 314 correspond to the fuel injection valve 206 of FIG. 1 for the respective cylinders, and the first- to fourth-cylinder ignition coils 315 to 318 each constitute the spark plug 224 of the respective cylinders of the ignition module 210 shown in FIG. 1.

Figure 3:
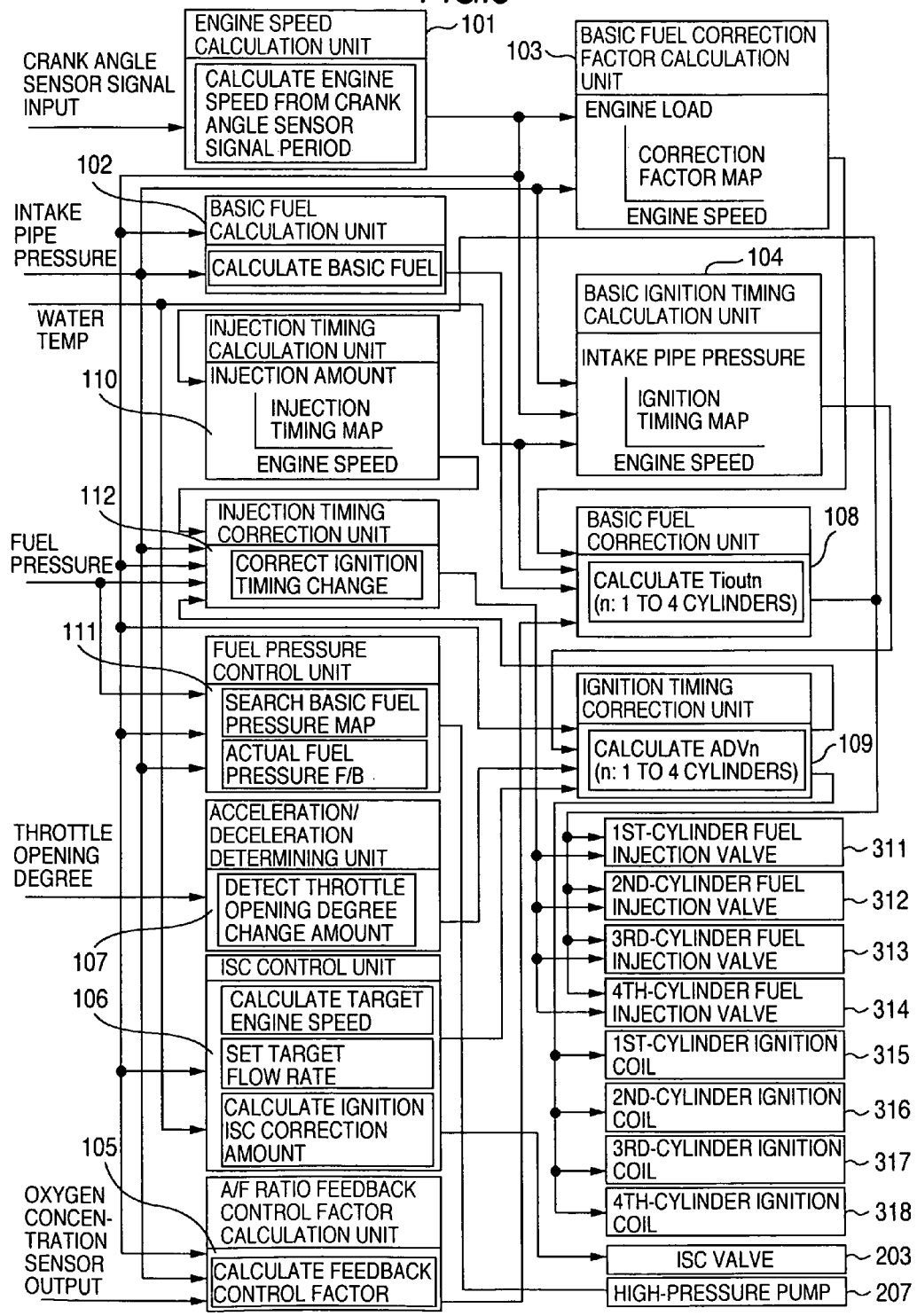
FIG. 3 is a control block diagram for an engine control system including a fuel control system according to this embodiment.

The control operation performed by the engine control system 300 according to this embodiment is explained below with reference to the control block diagram of FIG. 3.

In the engine control system 300, the MPU 302 executes a computer program to actually perform the operation of an engine speed calculation unit 101, a basic fuel calculation unit 102, a basic fuel correction factor calculation unit 103, a basic ignition timing calculation unit 104, an air-fuel ratio feedback control factor calculation unit 105, an ISC unit 106, an acceleration/deceleration determining unit 107, a basic fuel correction unit 108, an ignition timing correction unit 109, an injection timing calculation unit 110, a fuel pressure control unit 111 and an injection timing correction unit 112.

The engine speed calculation unit 101 mainly counts the number of inputs per unit time of the pulse signal change of the electrical signal output from the crank angle sensor 217 set to a predetermined crank angle of the engine 201, and by arithmetic processing, calculates the engine speed per unit time of the engine 201.

In the basic fuel calculation unit 102, the intake pipe pressure detected by the intake pipe pressure sensor 205 arranged on the intake pipe 204 of the engine 201 is assumed as an engine load, and the basic fuel required of the engine 201 in each operation area is calculated from the engine load and the engine speed calculated by the engine speed calculation unit 101.

In the basic fuel correction factor calculation unit 103, the correction factor for each operation area of the engine 201 with respect to the basic fuel calculated in the basic fuel calculation unit 102 is determined by referring a data map or the like in accordance with the engine speed calculated by the engine speed calculation unit 101 and the engine load indicated by the intake pipe pressure.

In the basic ignition timing calculation unit 104, the optimum ignition timing for each area of the engine 201 is determined by referring a data map or the like in accordance with the engine speed and the engine load determined by the intake pipe pressure.

In the air-fuel ratio feedback factor calculation unit 105, the air-fuel ratio feedback control factor is calculated from the output of the oxygen concentration sensor 211 arranged on the exhaust pipe 228 of the engine 201 in such a manner that the mixture gas of fuel and air supplied to the engine 201 is held at a target air-fuel ratio described later.

The ISC unit 106, in order to maintain a predetermined idle speed of the engine 201, calculates the target engine speed in idle mode and the ISC ignition timing correction amount. The ISC unit 106 outputs a target flow rate command signal for the ISC valve 203 to the ISC valve 203.

The acceleration/deceleration determining unit 107 processes (by differentiation) the electrical signal output from the throttle opening degree sensor 216, detects the change amount of the throttle opening degree, and by determining whether the engine is accelerated or decelerated, calculates the amount of ignition timing correction at the time of acceleration/deceleration (hereinafter referred to as the acceleration/deceleration-based ignition timing correction amount).

In the basic fuel correction unit 108, the basic fuel calculated by the basic fuel calculation unit 102 is corrected (fuel amount Tiout is calculated) in accordance with the basic fuel correction factor from the basic fuel correction factor calculation unit 103, the engine water temperature and the air-fuel ratio feedback control factor from the air-fuel ratio feedback control factor calculation unit 105.

In the ignition timing correction unit 109, the basic ignition timing determined by the basic ignition timing calculation unit 104 is corrected based on the ISC ignition timing correction amount calculated by the ISC unit 106 and the acceleration/deceleration-based ignition timing correction amount calculated by the acceleration/deceleration determining unit 107.

In the injection timing calculation unit 110, the basic fuel injection timing is determined by referring a data map or the like based on the engine speed and the fuel injection amount corrected by the basic fuel correction unit 108.

In the fuel pressure control unit 111, the basic fuel pressure is determined by referring a data map or the like based on the engine speed and the intake pipe pressure, and fed back in such a manner that the fuel pressure detected by the fuel pressure sensor 208 constitutes a basic fuel pressure. The fuel pressure control unit 111, based on the value fed back, outputs the signal for controlling the high-pressure fuel pump 207 to the high-pressure fuel pump 207 to achieve a target fuel pressure.

The injection timing correction unit 112 corrects the basic injection timing of fuel injection timing output from the injection timing calculation unit 110 based on the acceleration/deceleration-based ignition timing correction amount calculated by the acceleration/deceleration determining unit 107. This correction is carried out in accordance with the parameters related to the fuel injection velocity such as the engine speed, the intake pipe pressure and the fuel pressure as well as the ignition timing.

The fuel injection unit 311 to 314 for the respective cylinders inject the fuel to the respective cylinders based on the fuel amount Tiout calculated by the basic fuel correction unit 108 and the injection timing calculated by the injection timing correction unit 112.

The ignition coils 315 to 310 for the respective cylinders ignite the mixture gas in accordance with the ignition timing required of the engine corrected by the ignition timing correction unit 109.

Figure 4:
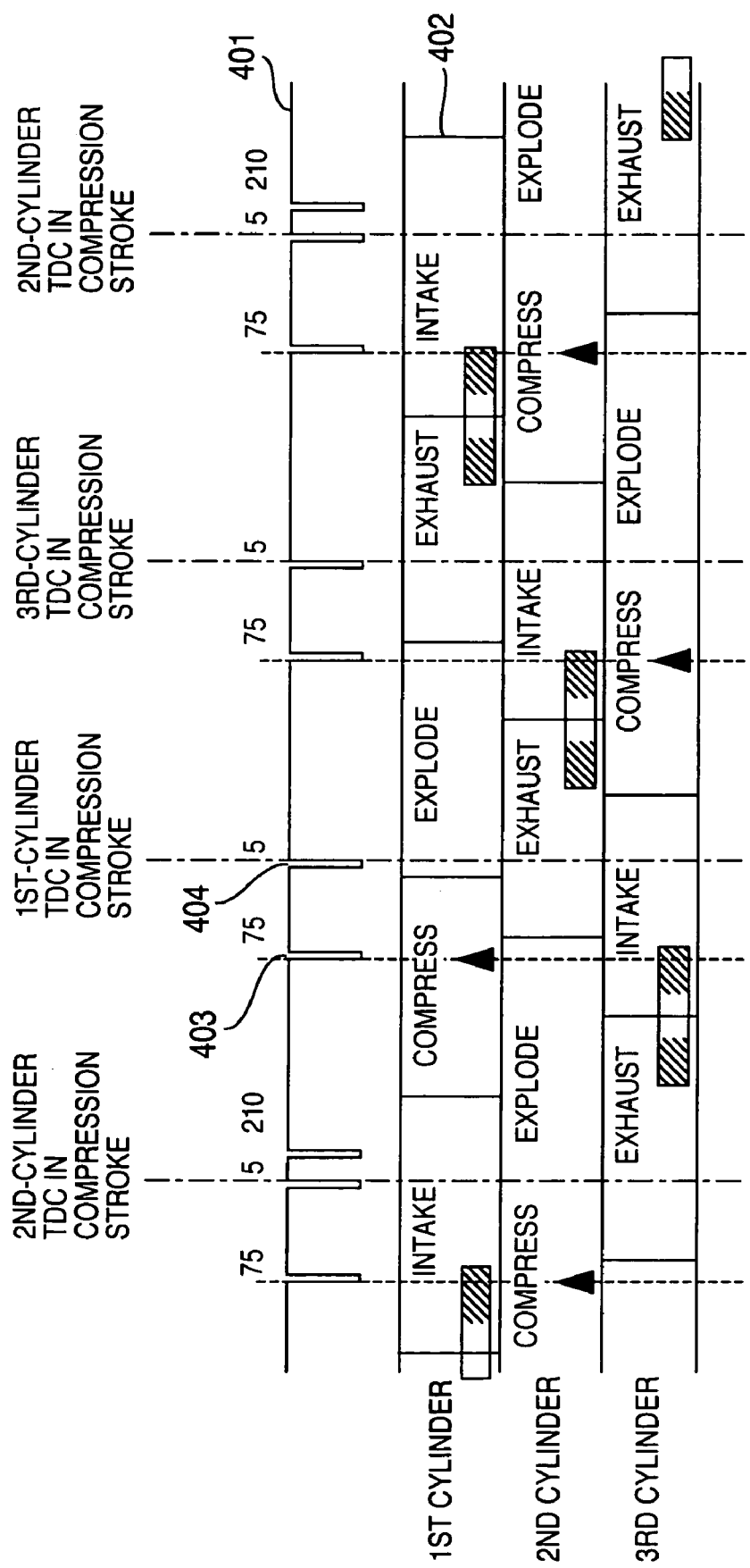
FIG. 4 is a time chart showing an example of setting the fuel injection timing by the fuel control system according to this embodiment.

An example of setting the fuel injection timing by the engine control system 300 according to this embodiment is explained with reference to FIG. 4.

The chart 401 shows a signal waveform of the camshaft sensor 209. This embodiment represents the case of a three-cylinder engine, in which a signal 404 is generated at an arbitrary angle before the top dead center in compression stroke of each cylinder.

The chart 402 shows the strokes of the first cylinder. The fuel injection is set at CA 75° before the top dead center in compression stroke of the first cylinder (timing 403), and the fuel is injected at an arbitrary timing between explosion and intake strokes.

Figure 5:
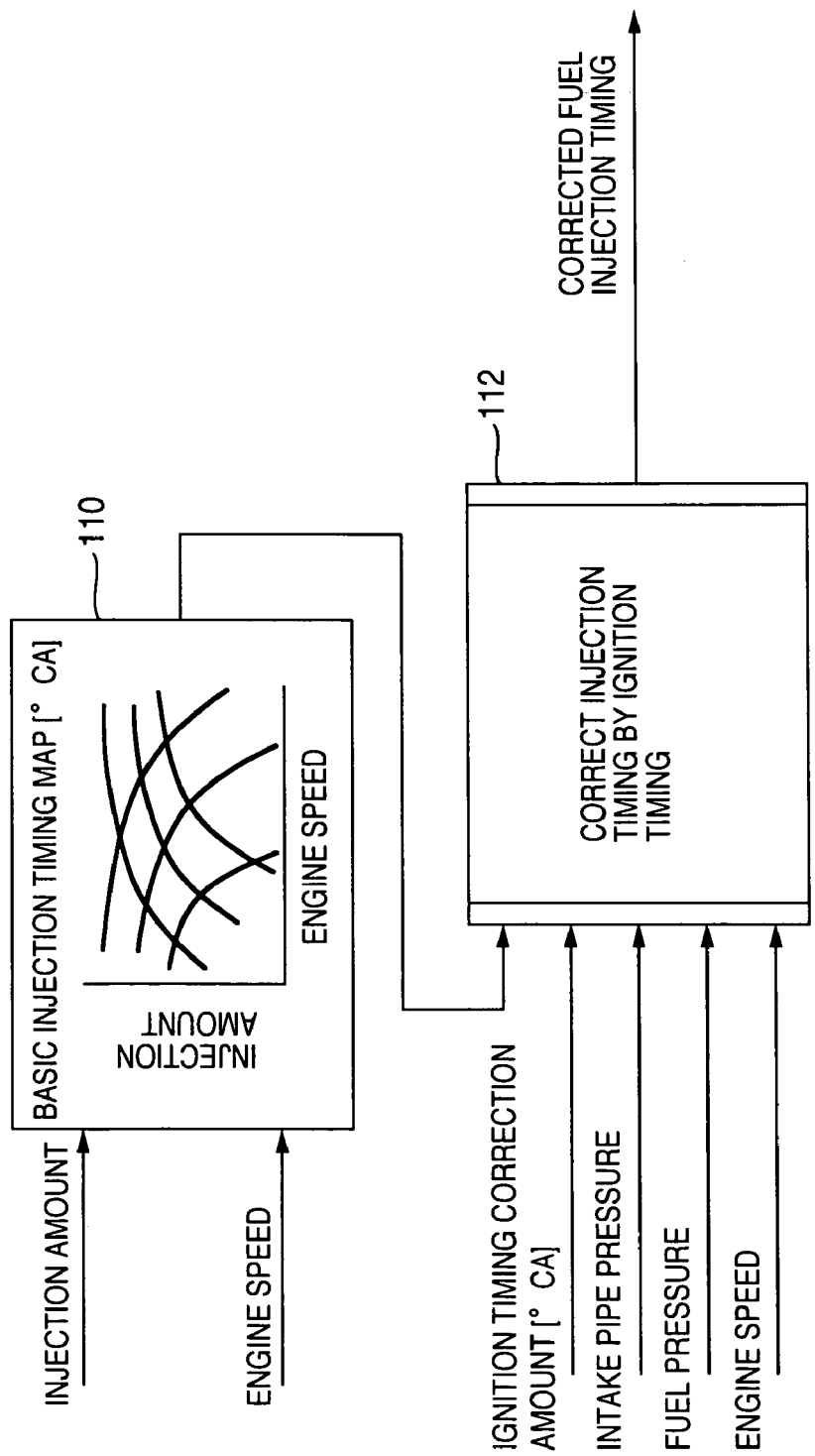
FIG. 5 is a block diagram showing only a fuel injection timing calculation means and a fuel injection timing correction means of the fuel control system according to this embodiment.

FIG. 5 shows only the injection timing calculation unit 110 and the injection timing correction unit 112 constituting the essential parts of the engine control system according to this embodiment.

The injection timing calculation unit 110 searches the map for the basic injection timing (basic fuel injection timing) from the finally calculated fuel amount and the engine speed including a correction.

The injection timing correction unit 112 corrects the basic injection timing from the injection timing calculation unit 110 based on the ignition timing correction amount, the intake pipe pressure, the fuel pressure and the engine speed.

Figure 6:
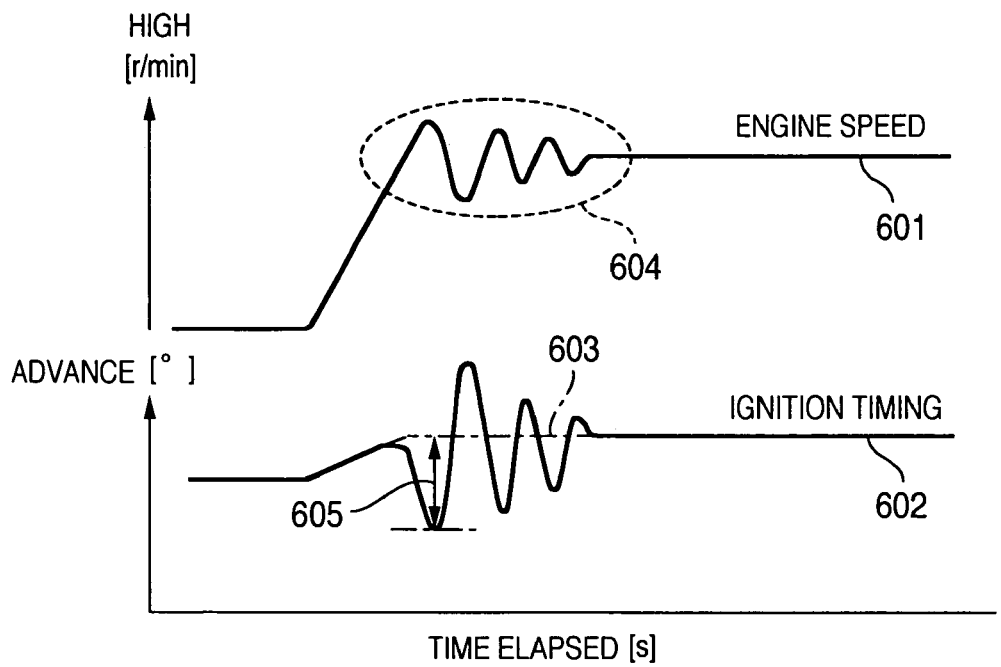
FIG. 6 is a time chart showing an example of the correction of the ignition time in accordance with acceleration/deceleration by the fuel control system according to this embodiment.

FIG. 6 shows an example of the process for correcting the acceleration/deceleration-based ignition timing based on by the engine control system 300 according to this embodiment.

In this time chart, the line 601 indicates the behavior of the engine speed at the time of acceleration, and the line 602 indicates the characteristic of the acceleration/deceleration-based ignition timing correction in accordance with the engine speed behavior. The dashed line 603 indicates the basic ignition timing, and the ignition timing for acceleration is corrected by the correction amount 605 in accordance with the engine speed behavior after acceleration in the area 604.

Figure 7:
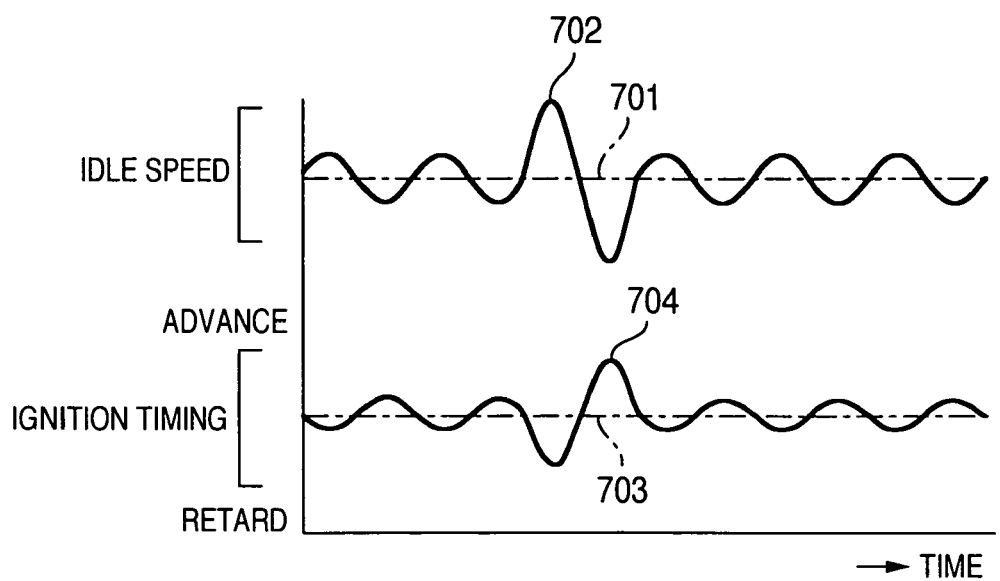
FIG. 7 is a time chart showing an example of the ISC ignition timing correction by the fuel control system according to this embodiment.

FIG. 7 shows an example of the process for correcting the ISC ignition timing by the engine control system 300 according to this embodiment.

In this time chart, the line 701 indicates the target value of the engine speed in idle operation, and the line 702 the engine speed behavior during idle operation. The line 703 indicates a basic advance angle for idle operation, and the actual ignition timing is corrected by ISC ignition timing and exhibits the behavior shown by line 704 so that the engine speed during the idle operation gets into the target engine speed.

Figure 8A:
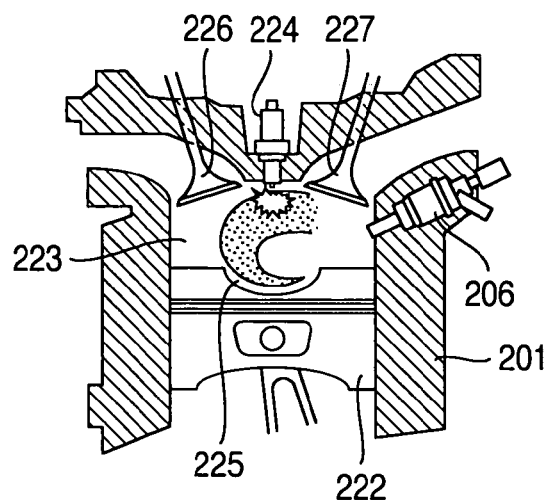
FIGS. 8A and 8B show diagrams for explaining an example of the fuel injection behavior and the state of combustion and ignition of the fuel in the cylinder direct injection engine.
Figure 8B:
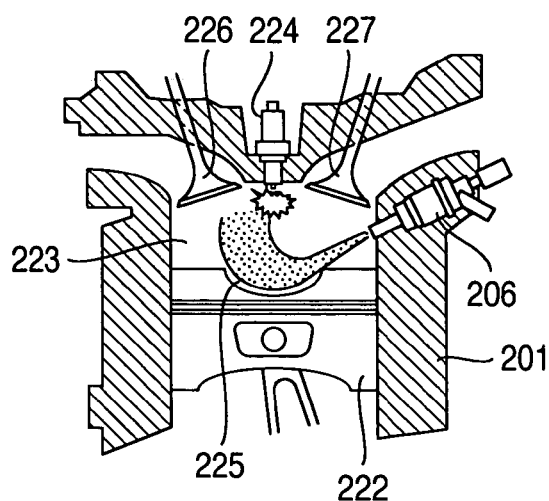

FIGS. 8A and 8B show an example of the behavior of the fuel injected into the cylinder (combustion chamber 223) and the state of combustion and ignition in the cylinder direction injection engine 201.

FIG. 8A shows the state in which the injected fuel is ignited at an appropriate ignition timing. In this case, the fuel is ignited at substantially the intermediate portion of the injected fuel flow.

FIG. 8B, as compared with FIG. 8A, shows that the ignition timing is corrected by advance with respect to the basic ignition timing. In this case, the injection timing is not corrected correspondingly by advance, and therefore the forward end of the injected fuel flow is ignited. As a result, the engine output torque and the exhaust emission are adversely affected.

Figure 9A:
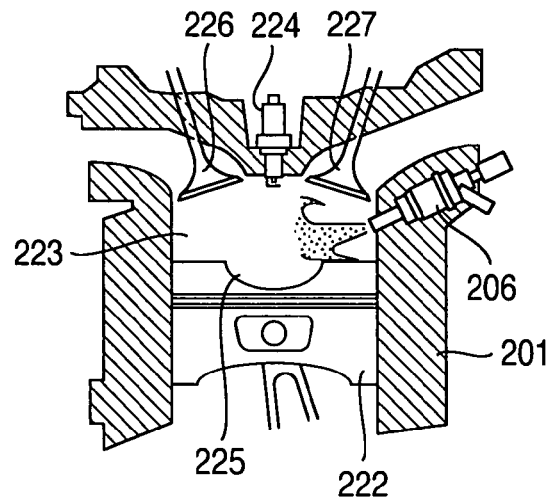
FIGS. 9A and 9B show diagrams for explaining the relation between the fuel spray and the internal pressure of the cylinder in the cylinder direct injection engine.
Figure 9B:
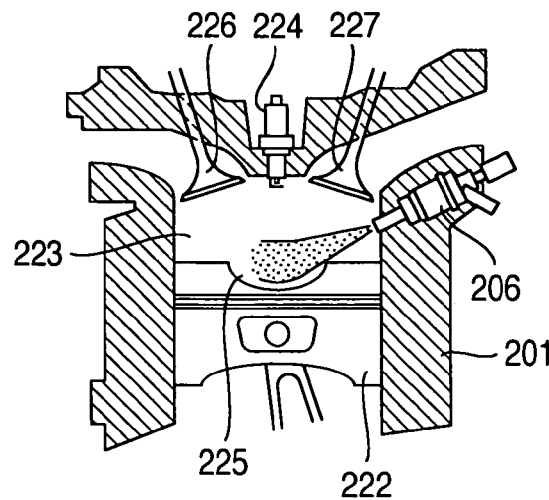

FIGS. 9A and 9B show the relation between the spray of the fuel injected into the cylinder (combustion chamber 223) and the internal cylinder pressure of the cylinder direct injection engine 201.

FIG. 9A shows a case in which the internal cylinder pressure is high (wide open throttle). In this case, the high internal pressure constitutes a resistance so that the fuel spray is dispersed and expanded. Also, the injection velocity is decreased.

FIG. 9B shows a case in which the internal cylinder pressure is low (almost idle operation). In this case, the resistance of the internal pressure is so low that the fuel spray proceeds straight ahead and the injection velocity is high. In order to ignite the fuel at the optimum position, the ignition timing is required to be corrected and so is the internal cylinder pressure.

Figure 10:
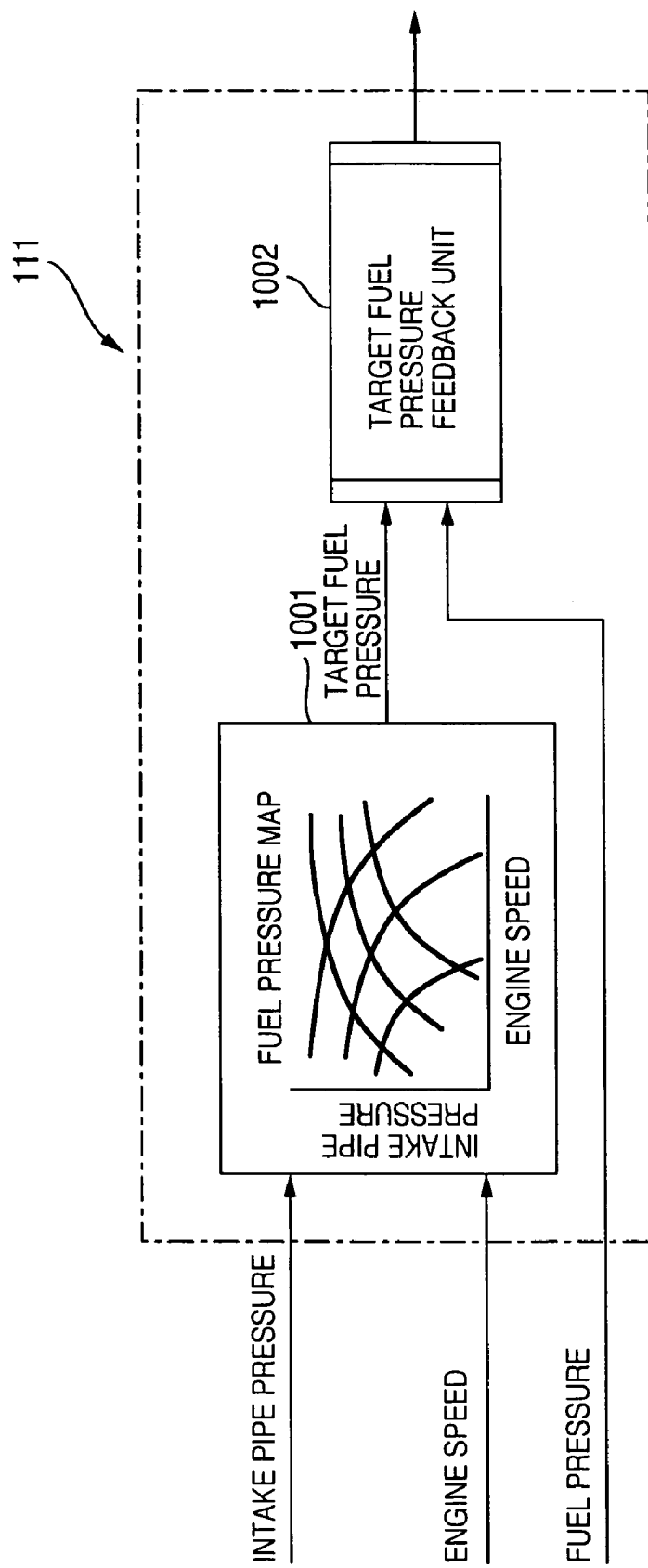
FIG. 10 is a block diagram showing the detail of the fuel pressure control unit of the fuel control system according to this embodiment.

FIG. 10 shows the detail of the fuel pressure control unit 111 according to this embodiment.

The fuel pressure control unit 111 includes a target fuel pressure setting unit 1001 and a feedback control unit 1002.

The target fuel pressure setting unit 1001 sets a target fuel pressure by searching the map based on the intake pipe pressure and the engine speed.

The feedback control unit 1002 controls the fuel pressure by feedback in such a manner as to eliminate the difference between the fuel pressure detected by the fuel pressure sensor 208 and the target fuel pressure, i.e. in such a manner as to achieve the target fuel pressure.

Figure 11:
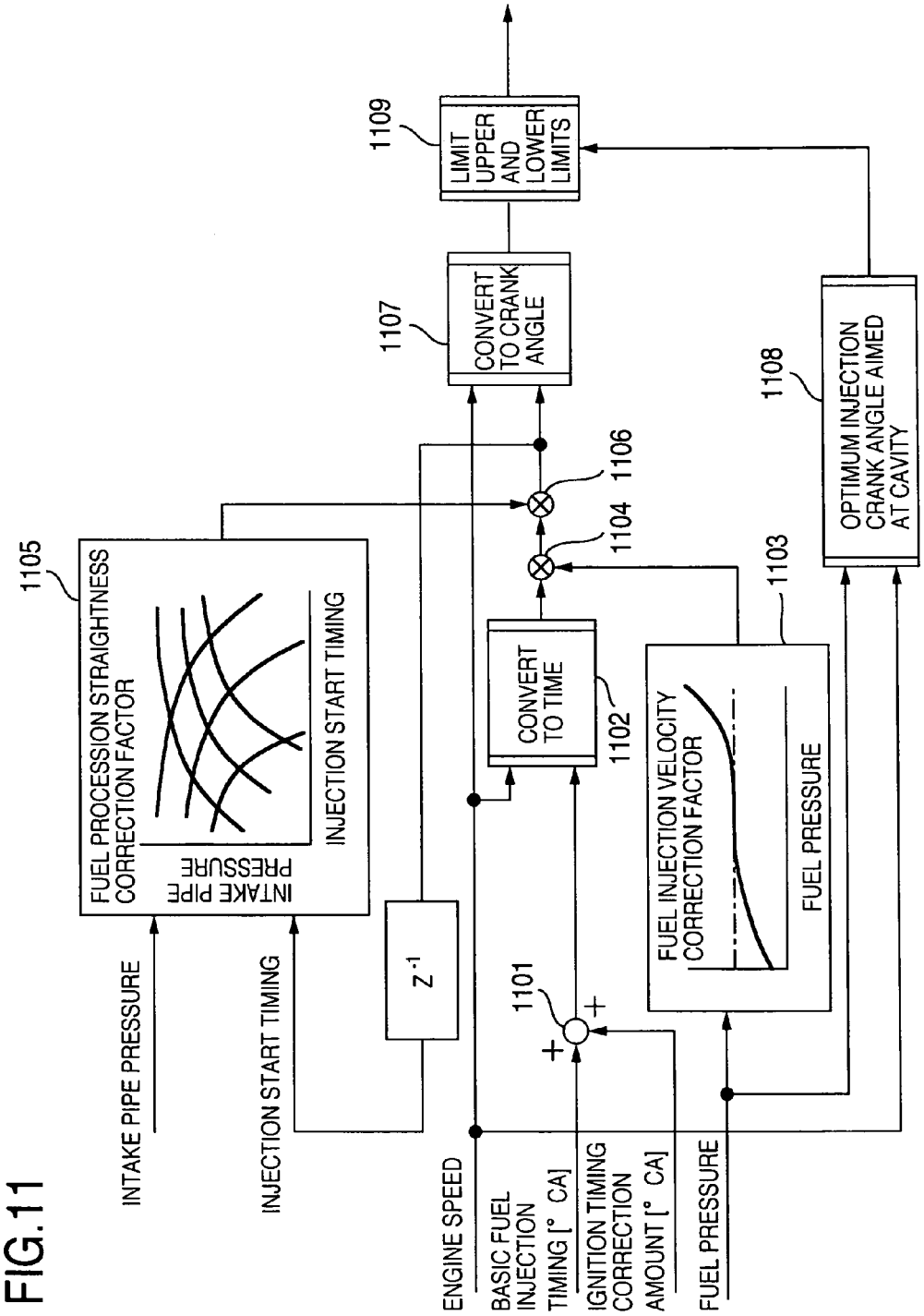
FIG. 11 is a block diagram showing the detail of the injection timing correction unit of the fuel control system according to this embodiment.

FIG. 11 shows the detail of the injection timing correction unit 112 according to this embodiment.

The injection timing correction unit 112 includes an adder 1101, a time converter 1102, a fuel injection velocity correction factor setting unit 1103, multipliers 1104, 1106, a fuel straightness correction factor setting unit 1105, a crank angle converter 1107, an optimum injection crank angle calculation unit 1108 and an injection time upper and lower limit limiter 1109.

The adder 1101 corrects the basic fuel injection timing (crank angle based) by the ignition correction amount. In the case where the ignition timing is corrected by advance from the basic ignition timing through this correction process, the fuel injection timing is corrected by advance, while in the case where the ignition timing is corrected by retardation, on the other hand, the fuel injection timing is corrected by retardation.

The time converter 1102 converts the corrected basic fuel injection timing (crank angle based) to time in accordance with the engine speed.

The fuel injection velocity correction factor setting unit 1103 searches the table for a fuel injection velocity correction factor in accordance with the fuel pressure.

The multiplier 1104 corrects the injection velocity for the fuel injection timing converted to time.

The fuel straightness correction factor setting unit 1105 searches the map for a fuel straightness correction factor based on the intake pipe pressure and the preceding injection timing.

The multiplier 1106, on the the hand, corrects the fuel straightness for the fuel injection timing (time based) after injection velocity correction by the fuel straightness correction factor.

The crank angle converter 1107 converts the injection timing corrected on time base to a value on crank angle base again in accordance with the engine speed.

The optimum injection crank angle calculation unit 1108 calculates the upper and lower limits of the injection timing (crack angle base) from the engine speed and the fuel pressure in such a manner that the fuel spray injected is accommodated in the cavity 225 of the piston 222.

The injection time upper and lower limit limiter 1109, based on the upper and lower limits of the injection timing calculated by the optimum injection crank angle calculation unit 1108, finally limits the upper and lower limits of the fuel injection timing indicated by the crank angle after correction.

Figure 12:
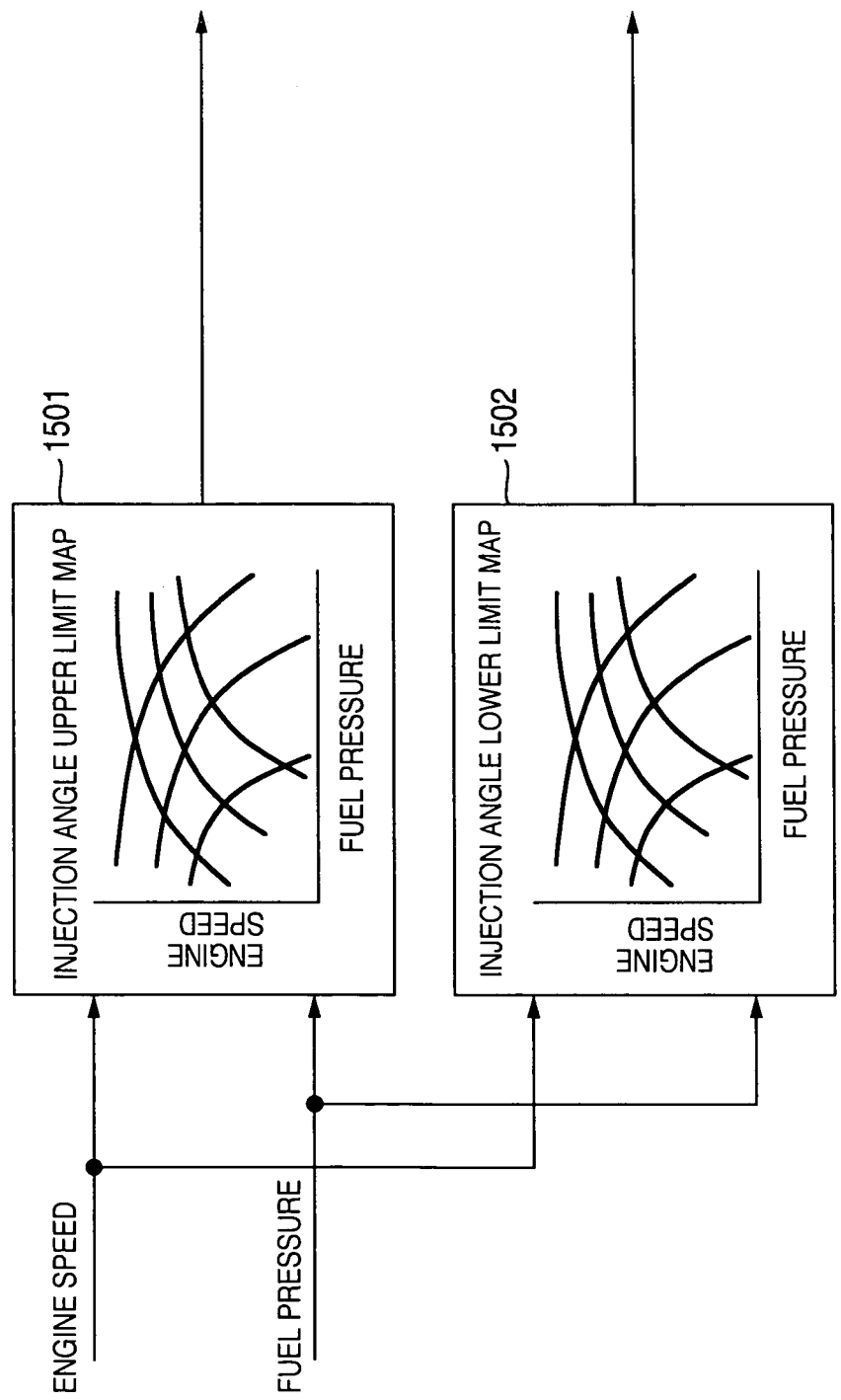
FIG. 12 is a block diagram showing the detail of an optimum injection crank angle calculation unit of the fuel control system according to this embodiment.

FIG. 12 shows the upper and lower limit values of the optimum angle of injection toward the cavity calculated in detail by the optimum injection crank angle calculation unit 1108. The injection angle upper limit setting unit 1501 searches the map for the upper limit value of the injection angle (limited value on advance side) based on the engine speed and the fuel pressure. The injection angle lower limit setting unit 1502, on the other hand, searches the map for the lower limit value of the injection angle (limited value on retardation side) in similar manner.

Figure 13:
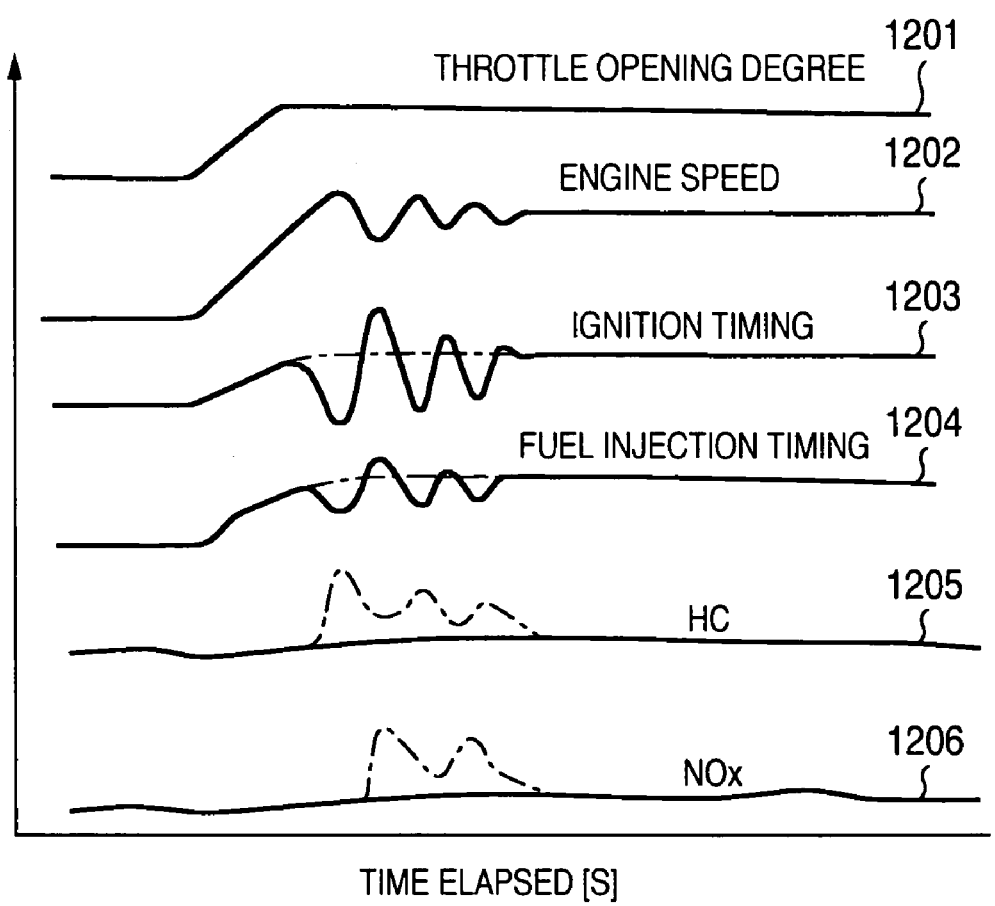
FIG. 13 is a graph showing an example of the behavior of the engine speed, ignition timing, fuel injection timing and the emission at the time of engine acceleration.

FIG. 13 shows an example of the behavior of the engine speed, the ignition timing, the fuel injection timing and the exhaust emission at the time of engine acceleration.

The curve 1201 shows the throttle opening degree, the curve 1202 the engine speed, the curve 1203 the ignition timing, the curve 1204 the fuel injection timing, the curve 1205 the levels of HC component and the curve 1206 the discharged NOx component in the exhaust gas.

The dashed lines in curves 1204, 1205, 1206 show a case in which the fuel injection timing is not corrected according to this embodiment. In this case, it is understood that even though the ignition timing is corrected, the levels of HC and NOx components are increased due to the fact that the fuel injection timing remains at the basic injection timing.

Figure 14:
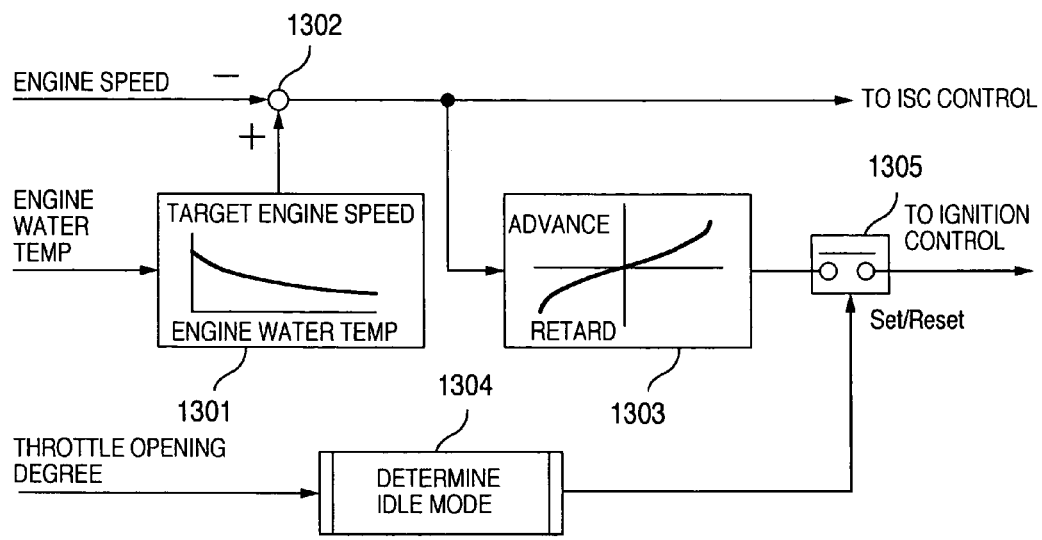
FIG. 14 is a block diagram showing the detail of an ISC ignition timing correction amount calculation unit for the engine control system according to this embodiment.

FIG. 14 shows the ISC ignition timing correction amount calculated in detail by the engine control system 300 according to this embodiment.

The ISC ignition timing correction amount is calculated first by the target engine speed setting unit 1301 searching the table for the target engine speed during idle operation from the engine water temperature. The difference between the retrieved target engine speed and the present engine speed is calculated by the adder 1302.

The ISC ignition timing correction amount calculation unit 1303 searches the table for the ISC ignition timing correction amount based on the difference in engine speed.

The idle state determining unit 1304 determines an idle state from the throttle opening degree, and upon determination that the idle operation is going on, the corrected ISC ignition timing is reflected in the basic ignition timing by the switch 1305.

Figure 15:
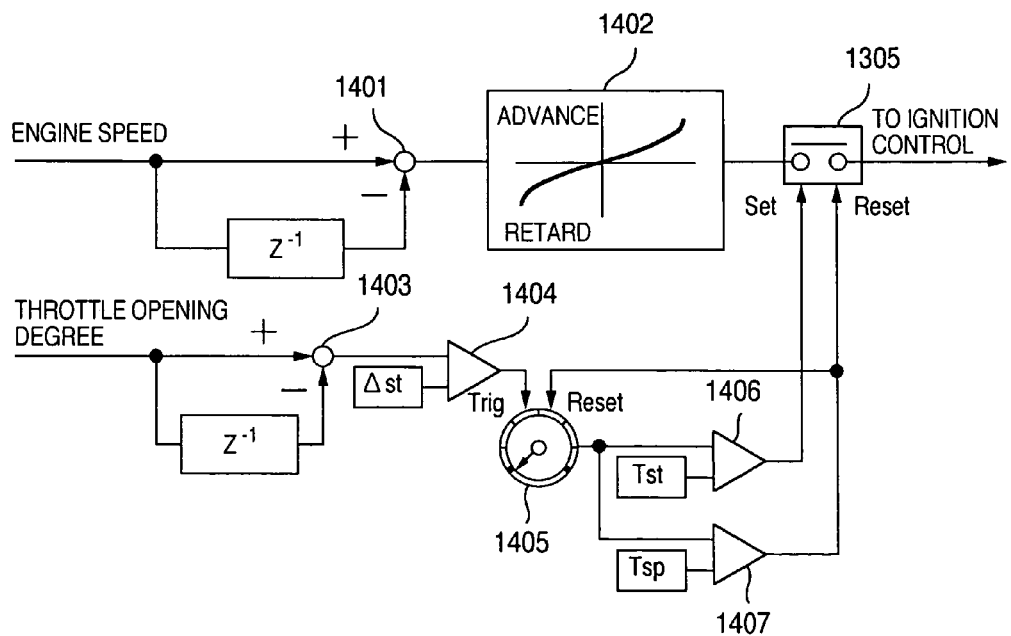
FIG. 15 is a block diagram showing the detail of an acceleration/deceleration-based ignition timing correction unit for the engine control system according to this embodiment.

FIG. 15 shows the detail of correction of the ignition timing based on acceleration/deceleration (acceleration/deceleration-based ignition timing correction) by the engine control system 300 according to this embodiment.

The adder 1401 calculates the engine speed change amount per each predetermined time and the acceleration/deceleration-based ignition timing correction amount setting unit 1402 searches the table for the acceleration/deceleration-based ignition timing correction amount based on the engine speed change amount.

The adder 1403 calculates the change amount of the throttle opening degree per predetermined time and the comparator 1404 determines whether the throttle change amount is larger than a predetermined amount or not. In the case where the throttle change amount is larger than the predetermined amount, the timer 1405 is triggered and started.

The comparators 1406, 1407 determine whether the timer value has exceeded a predetermined time.

In the case where the timer value is larger than the threshold value of the comparator 1406, the switch 1408 is set and the ignition timing is corrected based on the acceleration/deceleration.

Next, in the case where the timer value is larger than the threshold value of the comparator 1407, on the other hand, the switch 1408 is reset and the correction of the ignition timing based on the acceleration/deceleration is stopped.

The ignition timing correction by acceleration/deceleration is carried out after the delay of a predetermined time from the detection of acceleration.

Figure 16:
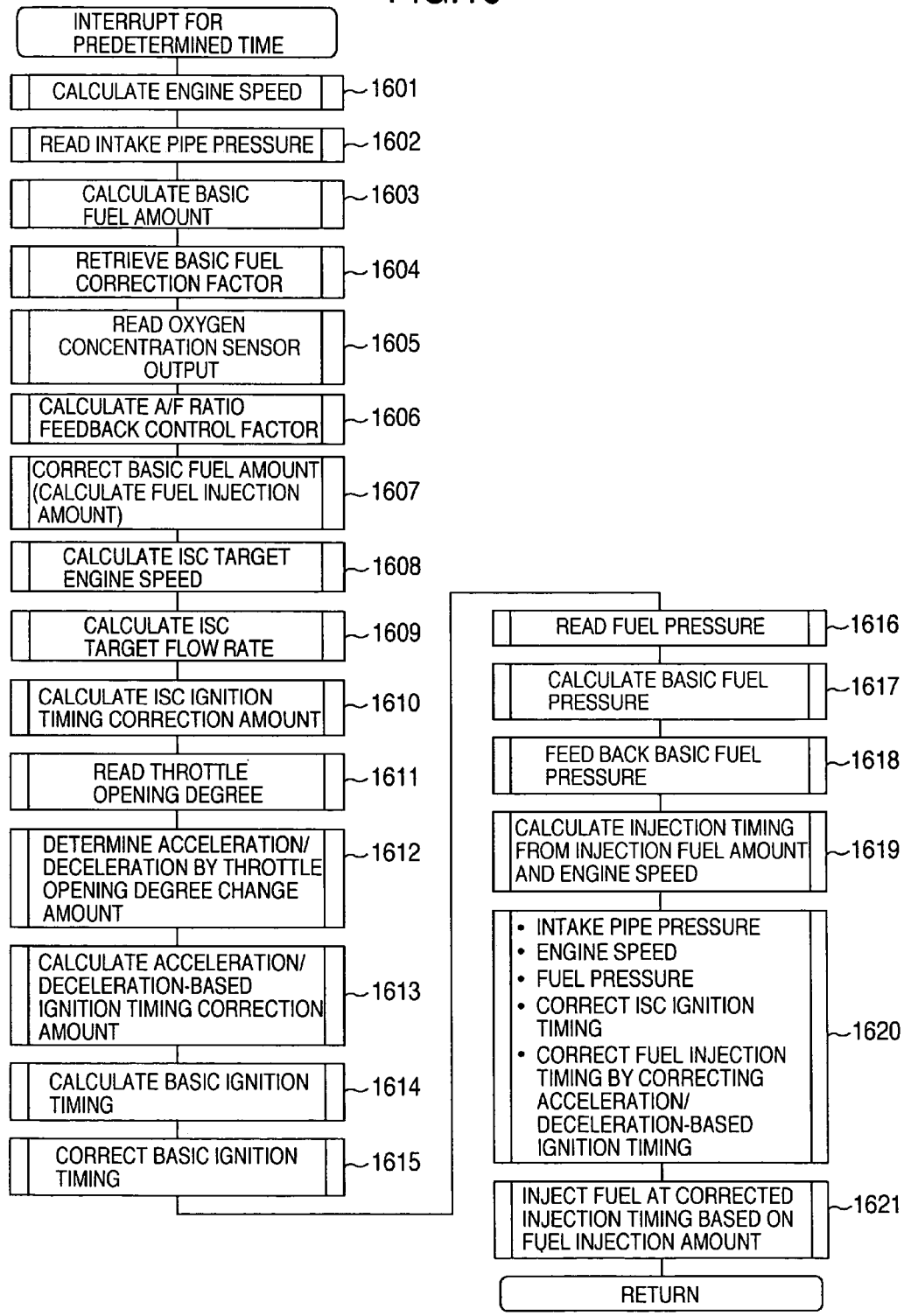
FIG. 16 is a flowchart showing the processing routine for engine control including fuel control according to this embodiment.

Next, the processing routine for engine control by the engine control system 300 is explained with reference to the flowchart shown in FIG. 16. This routine is repeatedly executed by interruption for a predetermined time.

First, the engine speed is calculated by the output signal of the camshaft sensor 209 (step 1601), and then the intake pipe pressure is read by retrieving the output signal of the intake pipe pressure sensor 205 (step 1602).

Next, the basic fuel amount is calculated from the engine speed and the intake pipe pressure (engine load) (step 1603).

The map is searched for the basic fuel correction factor from the engine speed and the intake pipe pressure (engine load) (step 1604).

Next, the output of the oxygen concentration sensor 211 is read (step 1605), and the air-fuel ratio is controlled by feedback to achieve the desired air-fuel ratio based on the oxygen concentration sensor signal thereby to calculate an air-fuel ratio feedback control factor.

Next, the basic fuel amount is corrected based on the basic fuel correction factor and the air-fuel ratio feedback control factor thereby to achieve the final fuel amount (step 1607).

The target engine speed for the idle operation is calculated from the engine water temperature (step 1608). The target flow rate for ISC is calculated by feedback in such a manner as to achieve the target engine speed for the idle operation (step 1609).

Next, the ignition timing correction amount for ISC is calculated from the difference between the target engine speed and actual engine speed during the idle operation (step 1610).

The throttle opening degree is read (step 1611), and from the change amount in the throttle opening degree, the engine acceleration/deceleration is determined (step 1612). Based on the acceleration/deceleration determination and the engine speed change amount, the acceleration/deceleration-based ignition timing correction amount is calculated (step 1613).

Next, the map is searched for the basic ignition timing based on the engine speed and the intake pipe pressure (step 1614). The basic ignition timing is corrected based on the ISC ignition timing correction amount and the acceleration/deceleration-based ignition timing correction amount (step 1615).

Next, the signal of the fuel pressure sensor 208 is read and the fuel pressure calculated (step 1616). The map is searched for the target basic fuel pressure from the engine speed and the intake pipe pressure (step 1617), and the fuel pressure is controlled to the basic fuel pressure by feedback (step 1618).

The map is searched for the basic injection timing based on the injection fuel amount and the engine speed (step 1619).

Next, the basic injection timing is corrected using the intake pipe pressure, the engine speed, the fuel pressure, the corrected ISC ignition timing and the corrected acceleration/deceleration-based ignition timing (step 1620). The corrected fuel injection timing is set and the final fuel injection amount is injected (step 1621).

Figure 17:
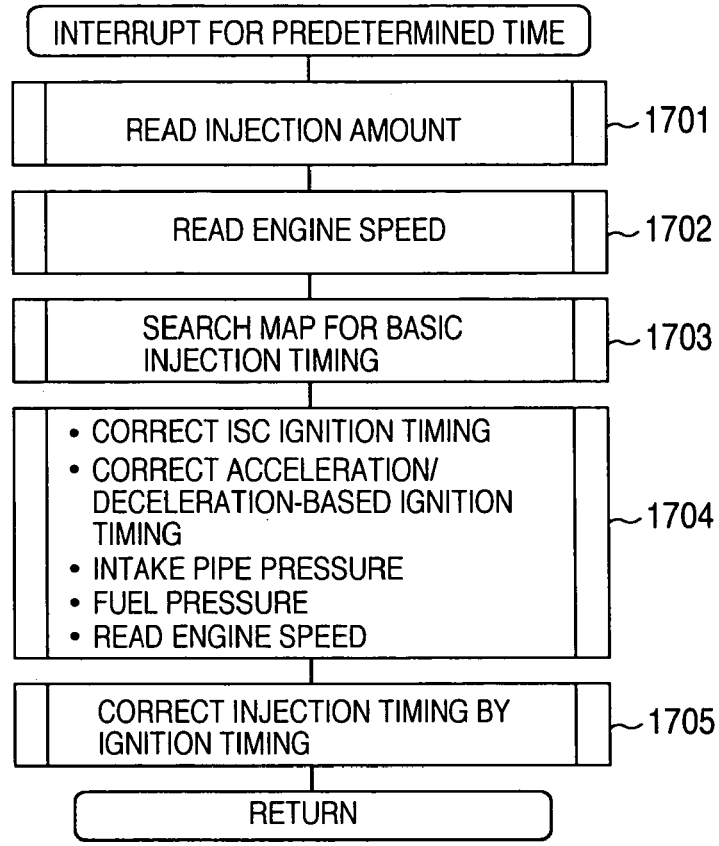
FIG. 17 is a flowchart showing the processing routine for correcting the fuel injection timing according to this embodiment.

Next, the processing routine for fuel injection timing correction is explained with reference to the flowchart shown in FIG. 17. This routine is repeatedly executed by interruption for a predetermined time.

First, the corrected final injection fuel amount is read (step 1701). Next, the engine speed is read (step 1702).

Based on the injection fuel amount and the engine speed thus read, the map is searched for the basic injection timing (step 1703).

Next, the ISC ignition timing correction amount, the acceleration/deceleration-based ignition timing correction amount, the intake pipe pressure, the fuel pressure and the engine speed are read (step 1704).

Based on the variables thus read (ISC ignition timing correction amount, acceleration/deceleration-based ignition timing correction amount, intake pipe pressure, fuel pressure and engine speed), the injection timing is corrected by ignition timing (step 1705).

Figure 18:
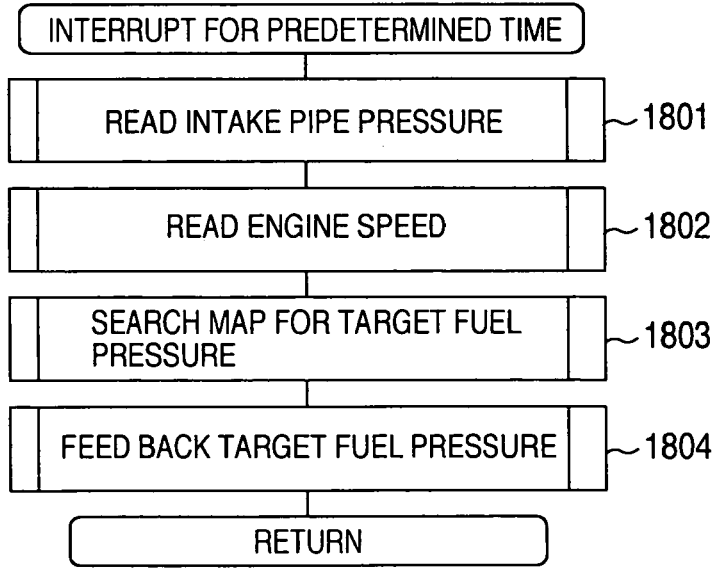
FIG. 18 is a flowchart showing the processing routine for controlling the fuel pressure according to this embodiment.

Next, the processing routine for controlling the fuel pressure is explained with reference to the flowchart of FIG. 18. This routine is executed repeatedly by interruption for a predetermined time.

First, the intake pipe pressure is read (step 1801), followed by reading the engine speed (step 1802).

Next, based on the intake pipe pressure and the engine speed thus read, the map is searched for the target fuel pressure (step 1803).

The fuel pressure is controlled by feed back to achieve the target fuel pressure.

Figure 19:
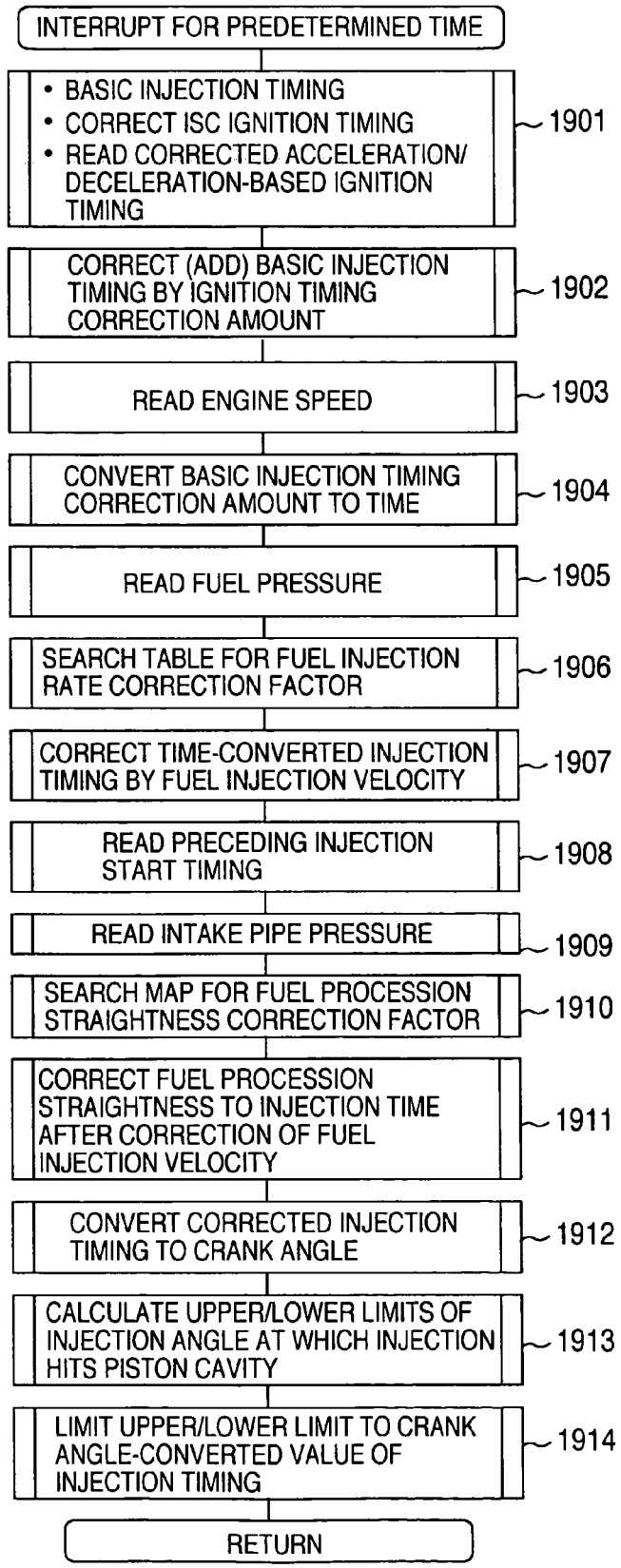
FIG. 19 is a flowchart showing the processing routine for correcting the fuel injection timing according to this embodiment.

The processing routine for fuel injection timing correction is explained in detail below with reference to the flowchart shown in FIG. 19. This routine is repeatedly executed by interruption for a predetermined time.

First, the basic injection timing, the ISC ignition timing correction amount and the acceleration/deceleration-based ignition timing correction amount are read (step 1901).

Next, the basic injection timing is corrected by the ignition timing correction amount (the sum of the ISC ignition timing correction amount and the acceleration/deceleration-based ignition timing correction amount) (step 1902). In this correction of the basic injection timing, the fuel injection timing is corrected by advance in the case where the ignition timing is corrected by advance from the basic ignition timing, while the fuel injection timing is corrected by retardation in the case where the ignition timing is corrected by retardation from the basic ignition timing.

Next, the engine speed is read (step 1903), and based on this engine speed, the basic injection timing corrected is converted from a value in terms of engine crank angle to a value in terms of time (step 1904).

Next, the fuel pressure is read (step 1905), and based on this fuel pressure, the map is searched for the fuel injection velocity correction factor (step 1906).

The fuel injection velocity correction factor is applied to the time converted value of the injection timing thereby to obtain the injection timing corrected by the injection velocity (step 1907).

Next, the preceding final injection timing is read (step 1908), and the intake pipe pressure is read (step 1909). Based on the final injection timing and the intake pipe pressure thus read, the map is searched for the fuel spray procession straightness correction factor (step 1910).

Then, the fuel spray procession straightness correction factor is applied to the injection timing corrected by the injection velocity thereby to obtain the final injection timing (step 1911).

Next, the final injection timing in terms of time (time-based final injection timing) is converted to the final injection timing in terms of the engine crank angle (engine crank angle-based final injection timing) (step 1912).

Next, based on the engine speed and the fuel pressure, the map is searched for the upper and lower limit values of the injection timing at which the injected fuel spray is accommodated in the cavity 225 of the piston 222 (step 1913). Based on the upper and lower limit values thus retrieved, the engine crank angle-based final injection timing is limited (step 1914).

Figure 20:
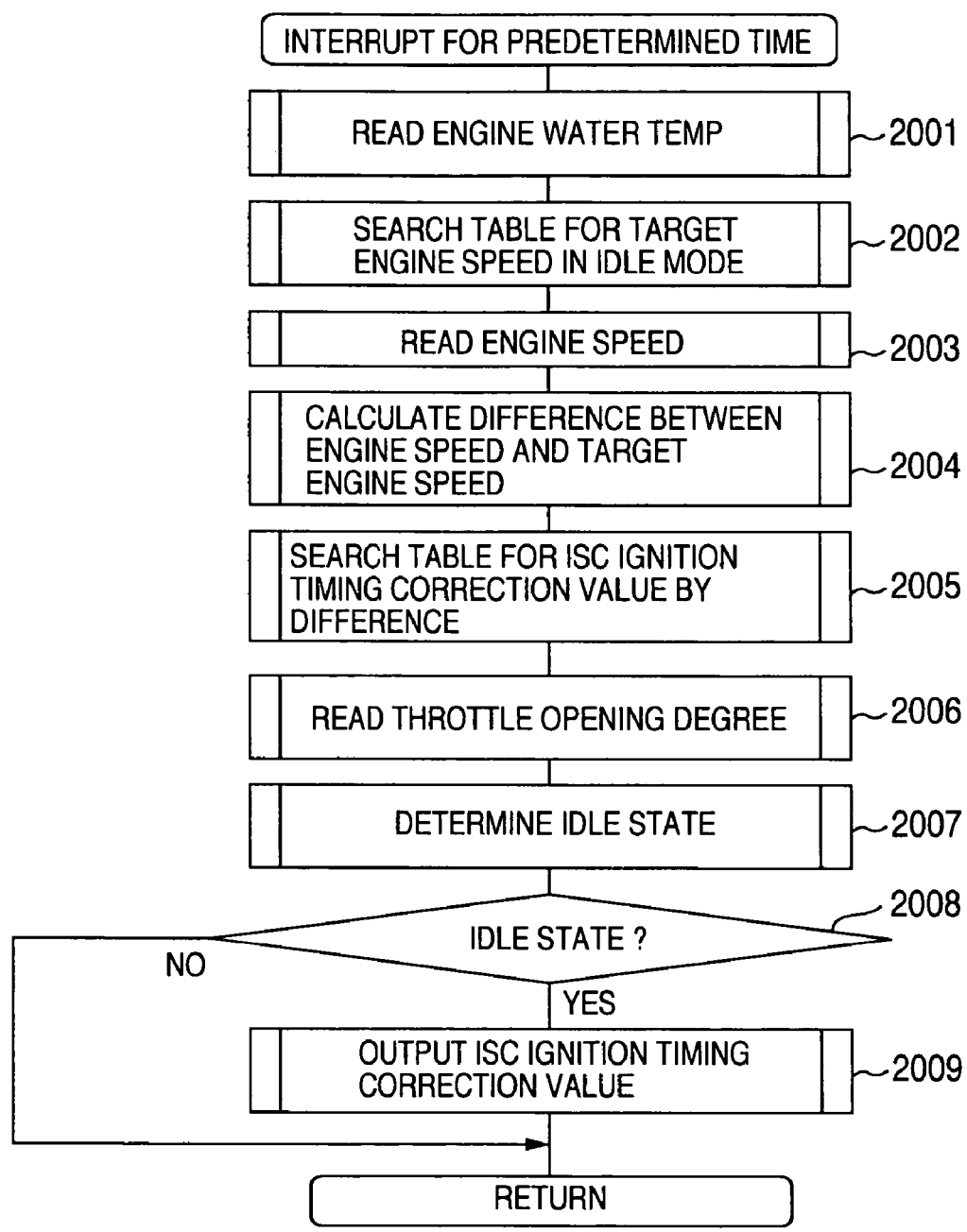
FIG. 20 is a flowchart showing the processing routine for the ISC ignition timing correction according to this embodiment.

Next, the processing routine for ISC ignition timing correction is explained with reference to the flowchart shown in FIG. 20. This routine is repeatedly executed by interruption for a predetermined time.

First, the engine water temperature is read (step 2001). Next, based on the engine water temperature thus read, the table is searched for the target engine speed for idle operation (step 2002).

Next, the engine speed is read (step 2003), and the difference between the engine speed thus read and the target engine speed for idle operation is calculated (step 2004).

Based on this difference, the map is searched for the ISC ignition timing correction amount (step 2005).

Next, the throttle opening degree is read (step 2006), and based on the throttle opening degree thus read, an idle mode is determined (step 2007). Upon determination of an idle mode, the ISC ignition timing correction amount is reflected in the ignition timing (steps 2008, 2009).

Figure 21:
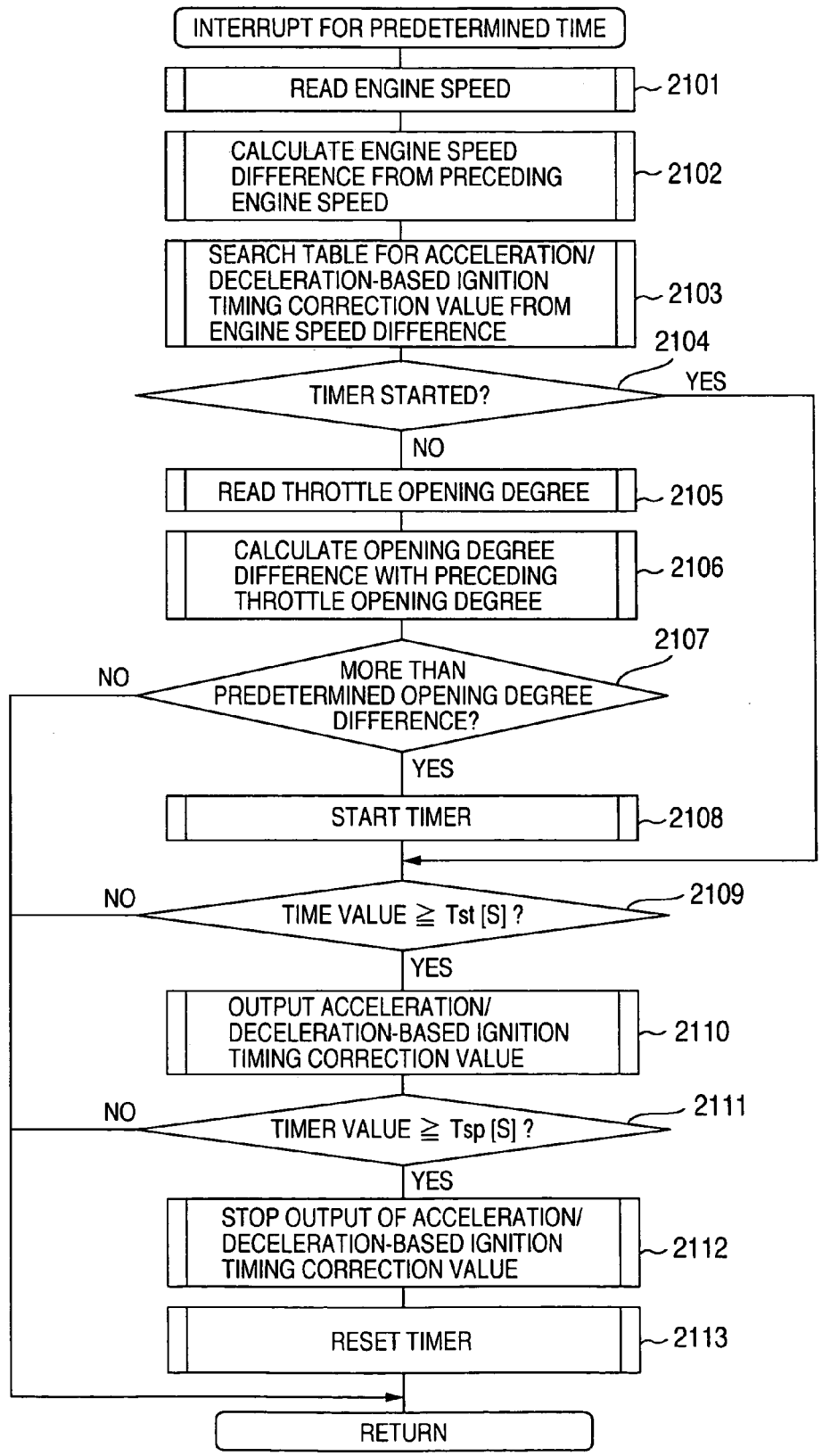
FIG. 21 is a flowchart showing the processing routine for the acceleration/deceleration-based ignition timing correction according to this embodiment.

Now, the detail of the processing routine for the acceleration/deceleration-based ignition timing correction is explained with reference to the flowchart shown in FIG. 21. This routine is repeatedly executed by interruption for a predetermined time.

First, the engine speed is read (step 2101), and the difference with the preceding engine speed is calculated (step 2102). Based on the engine speed difference thus calculated, the table is searched for the acceleration/deceleration-based ignition timing correction amount (step 2103).

Next, it is determined whether the timer is turned on at the present time or not (step 2104). In the case where the timer is turned on, the process of steps 2105 to 2108 is skipped.

In the case where the timer is not turned on, on the other hand, the throttle opening degree is read (step 2105), and the difference with the preceding throttle opening degree is calculated (step 2106). It is determined whether the opening degree difference thus calculated is more than a predetermined value or not (step 2107), and upon negative determination, the process is returned. In the case where the opening degree difference is more than a predetermined value, on the other hand, it is determined whether the timer value is more than a predetermined value or not (step 2109), and upon negative determination, the process is returned.

In the case where the timer value is more than the predetermined value, the acceleration/deceleration-based ignition timing correction value is reflected in the ignition timing (step 2110).

Next, it is determined whether the timer value is more than another predetermined value or not (step 2111). In the case where the answer is negative, the process is returned as it is. In the case where the answer is affirmative, on the other hand, the acceleration/deceleration-based ignition timing correction value is not reflected in the ignition timing (step 2112), and the timer is reset (step 2113).

Figure 22:
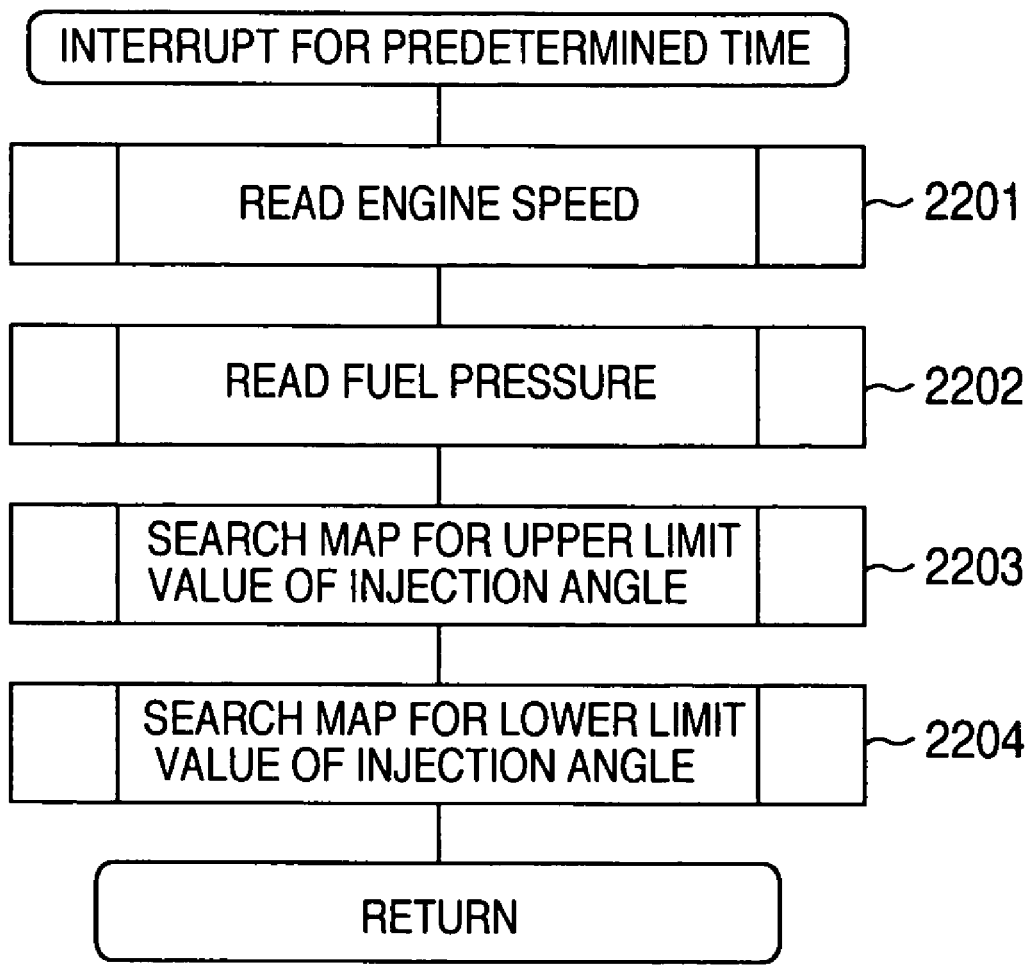
FIG. 22 is a flowchart showing the processing routine for calculating the upper and lower limits of the optimum injection angle according to this embodiment.

Next, the processing routine for calculating the upper and lower limit values of the optimum injection angle is explained with reference to the flowchart shown in FIG. 22. This routine is repeatedly executed by interruption for a predetermined time.

First, the engine speed is read (step 2201). Next, the fuel pressure is read (step 2202). Based on the engine speed and the fuel pressure thus read, the map is searched for the upper and lower limit values of the injection angle (step 2203).

As explained above, the fuel injection timing is corrected by advance in the case where the ignition timing is corrected by advance from the basic ignition timing, while the fuel injection timing is corrected by retardation in the case where the ignition timing is corrected by retardation. In this way, the fuel spray can be appropriately ignited at a predetermined position (portion) preset while the engine is in steady state.

Also, by correcting the fuel injection timing taking the change in the fuel spray procession straightness, the intake air amount (intake pipe pressure) affecting the injection velocity and the fuel pressure into account, a fuel spray ignition position required of the fuel spray can be more accurately determined.

An excessive correction of the fuel injection timing would cause the failure of the fuel spray to proceed to the cavity 225 of the piston 222 for strengthening the fluidity. By imposing a limitation taking the fuel arrival time from the fuel pressure, etc., therefore, the fuel spray accurately reaches the cavity 225 of the piston 222. Under any conditions, therefore, the fluidity of the fuel spray is strengthened appropriately.

As a result, even in the case where the ignition timing is changed from the basic ignition timing by correction, etc., stable combustion in the cylinder is performed. Also, even in the case where the fuel spray conditions (procession straightness and injection velocity) are changed due to the change in the fuel pressure or the intake pipe pressure, a stable, satisfactory combustion is accomplished for an improved fuel consumption rate and emission performance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fuel control system for a cylinder direct injection internal combustion engine for injecting the fuel toward a cavity formed at the top of each piston in the combustion chamber by a fuel injection valve, comprising:
    a fuel injection timing correction means for correcting the fuel injection timing of the fuel injection valve in accordance with the corrected ignition timing; and
    a fuel injection timing limiting means for limiting the correction amount of the fuel injection timing in accordance with the state of the internal combustion engine so that the fuel spray reaches the cavity.

2. The fuel control system for the internal combustion engine according to claim 1,
    wherein the fuel injection timing limiting means sets the upper and lower limits of the fuel injection timing based on the engine speed and the fuel pressure of the internal combustion engine, and accordingly limits the correction amount of the fuel injection timing.

3. The fuel control system for the internal combustion engine according to claim 1,
    wherein the fuel injection timing correction means corrects by advancing the injection timing in the case where the ignition timing is corrected by advance, while the fuel injection timing correction means corrects by retarding the injection timing in the case where the ignition timing is corrected by retardation.

4. The fuel control system for the internal combustion engine according to claim 1,
    wherein the ignition timing is corrected at the time of at least selected one of the idle operation and the acceleration/deceleration.

5. The fuel control system for the internal combustion engine according to claim 1,
    wherein the fuel injection timing correction means corrects the fuel injection timing taking the parameters related to the fuel injection velocity into account.

6. The fuel control system for the internal combustion engine according to claim 5,
    wherein the parameter related to the fuel injection velocity include at least selected one of the fuel pressure and the intake pipe pressure.

7. A fuel control system for a cylinder direct injection internal combustion engine for directly injecting the fuel into a combustion chamber by a fuel injection valve, comprising a fuel injection timing correction means for correcting the fuel injection timing of the fuel injection valve in accordance with the corrected ignition timing;
    wherein the fuel injection timing correction means corrects the fuel injection timing taking the parameters related to the fuel injection velocity into account; and
    wherein the parameters related to the fuel injection velocity include at least selected one of the fuel pressure and the intake pipe pressure.

* * * * *